(12) United States Patent
Zhu

(10) Patent No.: US 11,096,173 B2
(45) Date of Patent: Aug. 17, 2021

(54) METHOD AND APPARATUS FOR TRANSMITTING AND ACQUIRING COMMON DOWNLINK CONTROL INFORMATION

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 89 days.

(21) Appl. No.: 16/608,780

(22) PCT Filed: Apr. 28, 2017

(86) PCT No.: PCT/CN2017/082531
§ 371 (c)(1),
(2) Date: Oct. 25, 2019

(87) PCT Pub. No.: WO2018/195970
PCT Pub. Date: Nov. 1, 2018

(65) Prior Publication Data
US 2020/0205157 A1 Jun. 25, 2020

(51) Int. Cl.
*H04W 72/04* (2009.01)
*H04W 76/11* (2018.01)
*H04W 80/02* (2009.01)

(52) U.S. Cl.
CPC ..... *H04W 72/0466* (2013.01); *H04W 72/042* (2013.01); *H04W 76/11* (2018.02); *H04W 80/02* (2013.01)

(58) Field of Classification Search
CPC ............. H04W 72/0466; H04W 76/11; H04W 72/042; H04W 80/02; H04L 5/0091
See application file for complete search history.

(56) References Cited

U.S. PATENT DOCUMENTS 9,596,056 B2 * 3/2017 Kim .................... H04L 1/0061
2013/0195041 A1 8/2013 Papasakellariou et al.
(Continued)

FOREIGN PATENT DOCUMENTS

| CN | 102238531 A | 11/2011 |
| CN | 105636223 A | 6/2016 |
| CN | 105812108 A | 7/2016 |

OTHER PUBLICATIONS

ISA State Intellectual Property Office of the People's Republic of China, International Search Report Issued in Application No. PCT/CN2017/082531, dated Jan. 5, 2018, WIPO, 4 pages.
(Continued)

*Primary Examiner* — Mohammad S Anwar
(74) *Attorney, Agent, or Firm* — Syncoda LLC; Feng Ma

(57) ABSTRACT

A method for transmitting and acquiring common downlink control information includes: common downlink control information is group-scrambled with pieces of preset group-scrambling information corresponding to terminal groups one by one to acquire grouped common downlink control information; and transmitting a physical downlink control channel (PDCCH) carrying target common downlink control information to a terminal, so that the terminal demodulates the PDCCH according to the pieces of the preset group-scrambling information to acquire the target common downlink control information, where the target common downlink control information is common downlink control information corresponding to a target terminal group to which the terminal belongs in the grouped common downlink control information.

18 Claims, 12 Drawing Sheets

(56) References Cited

U.S. PATENT DOCUMENTS

2015/0016361 A1     1/2015   Kim et al.
2015/0245380 A1*   8/2015   Li ..................... H04W 72/082
                                                                                    370/329
2015/0358917 A1    12/2015   Gao et al.

OTHER PUBLICATIONS

State Intellectual Property Office of the People's Republic of China, Office Action and Search Report Issued in Application No. 201780000287X, dated Sep. 4, 2019, 22 pages,(Submitted with Machine Translation).

* cited by examiner

METHOD AND APPARATUS FOR TRANSMITTING AND ACQUIRING COMMON DOWNLINK CONTROL INFORMATION

CROSS-REFERENCE TO RELATED APPLICATION

This application is a national stage of International Application No. PCT/CN2017/082531 filed on Apr. 28, 2017, the disclosure of which is hereby incorporated by reference in its entirety.

TECHNICAL FIELD

The present disclosure relates to the field of communication technology, and in particular, to methods and apparatuses for transmitting and acquiring common downlink control information.

BACKGROUND

In the related art, transmission of a terminal is based on scheduling of a base station. For downlink transmission, the terminal receives a PDCCH (Physical Downlink Control Channel) carrying information, such as a time domain location, a frequency domain location, and a transmission format, for indicating the terminal to receive data. The PDCCH may be divided into a common PDCCH and a terminal-specific PDCCH. The common PDCCH is used to carry common downlink control information for a plurality of terminals. The terminal acquires the common downlink control information by demodulating the common PDCCH.

5G, i.e., NR (New Radio) system standardization, is being carried out in 3GPP ($3^{rd}$ Generation Partnership Project). In a 5G system, a plurality of terminal groups may exist in a cell, and pieces of common downlink control information corresponding to different terminal groups are also different. Therefore, the transmission and acquisition methods of the common downlink control information in the related art have not been applicable.

SUMMARY

In order to overcome the problems existing in the related art, a method and an apparatus for transmitting and acquiring common downlink control information are provided by examples of the present disclosure.

According to a first aspect of examples of the present disclosure, a method of transmitting common downlink control information is provided, which being applied to a base station and including:

group-scrambling common downlink control information with pieces of preset group-scrambling information corresponding to terminal groups one by one to acquire grouped common downlink control information; and transmitting a PDCCH carrying target common downlink control information to a terminal, so that the terminal demodulates the PDCCH according to the pieces of the preset group-scrambling information to acquire the target common downlink control information, where the target common downlink control information is common downlink control information of the grouped common downlink control information corresponding to a target terminal group to which the terminal belongs.

Optionally, the pieces of the preset group-scrambling information include:

a plurality of preset radio network temporary identifiers (RNTIs) corresponding to the terminal groups one by one; or a preset RNTI and a plurality of preset scrambling sequences, where the plurality of preset scrambling sequences correspond to the terminal groups one by one.

Optionally, the method further includes:

transmitting the pieces of the preset group-scrambling information to the terminal via target signaling, where the target signaling comprises any of radio resource control signaling, system information, a medium access control (MAC) control element, and physical layer signaling.

According to a second aspect of examples of the present disclosure, a method of acquiring common downlink control information is provided, which being applied to a terminal and including:

receiving a PDCCH carrying target common downlink control information from a base station, where the target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one; and demodulating the PDCCH according to the pieces of the preset group-scrambling information to acquire the target common downlink control information.

Optionally, the pieces of preset group-scrambling information include:

a plurality of preset RNTIs corresponding to the terminal groups one by one; or a preset RNTI and a plurality of preset scrambling sequences, where the plurality of preset scrambling sequences correspond to the terminal groups one by one.

Optionally, demodulating the PDCCH according to the pieces of the preset group-scrambling information to acquire the target common downlink control information includes:

demodulating the PDCCH respectively with each piece of the preset group-scrambling information; and acquiring the target common downlink control information in a case where the PDCCH is successfully demodulated with target preset group-scrambling information of the preset group-scrambling information Optionally, if the pieces of the preset group-scrambling information comprise the plurality of the preset RNTIs, demodulating the PDCCH according to the pieces of the preset group-scrambling information to acquire the target common downlink control information includes:

determining, from among the plurality of the preset RNTIs, a target preset RNTI corresponding to the target terminal group to which the terminal belongs; and demodulating the PDCCH according to the target preset RNTI to acquire the target common downlink control information.

Optionally, if the pieces of the preset group-scrambling information comprise the preset RNTI and the plurality of the preset scrambling sequences, demodulating the PDCCH according to the pieces of the preset group-scrambling information to acquire the target common downlink control information includes:

determining, from among the plurality of the preset scrambling sequences, a target preset scrambling sequence corresponding to the target terminal group to which the terminal belongs; and demodulating the PDCCH according to the preset RNTI and the target preset scrambling sequence to acquire the target common downlink control information.

Optionally, prior to demodulating the PDCCH according to the pieces of the preset group-scrambling information to acquire the target common downlink control information, the method further includes:

acquiring the pieces of the preset group-scrambling information based on a pre-defined protocol for communication between the terminal and the base station; or receiving the pieces of the preset group-scrambling information transmitted by the base station via target signaling, where the target signaling comprises any of radio resource control signaling, system information, a MAC control element, and physical layer signaling.

According to a third aspect of examples of the present disclosure, an apparatus for transmitting common downlink control information is provided, which being applied to a base station and including:

a scrambling module configured to group-scramble common downlink control information with pieces of preset group-scrambling information corresponding to terminal groups one by one to acquire grouped common downlink control information; and a first transmitting module configured to transmit a PDCCH carrying target common downlink control information to a terminal, so that the terminal demodulates the PDCCH according to the pieces of the preset group-scrambling information to acquire the target common downlink control information, where the target common downlink control information is common downlink control information of the grouped common downlink control information corresponding to a target terminal group to which the terminal belongs.

Optionally, the pieces of the preset group-scrambling information include:

a plurality of preset RNTIs corresponding to the terminal groups one by one; or a preset RNTI and a plurality of preset scrambling sequences, where the plurality of preset scrambling sequences correspond to the terminal groups one by one.

Optionally, the apparatus further includes:

a second transmitting module configured to transmit the pieces of the preset group-scrambling information to the terminal via target signaling, where the target signaling comprises any of radio resource control signaling, system information, a MAC control element, and physical layer signaling.

According to a fourth aspect of examples of the present disclosure, an apparatus for acquiring common downlink control information is provided, which being applied to a terminal and including:

a first receiving module configured to receive a PDCCH carrying target common downlink control information from a base station, where the target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one; and a first acquiring module configured to demodulate the PDCCH according to the pieces of the preset group-scrambling information to acquire the target common downlink control information.

Optionally, the pieces of the preset group-scrambling information include:

a plurality of preset RNTIs corresponding to the terminal groups one by one; or a preset RNTI and a plurality of preset scrambling sequences, where the plurality of preset scrambling sequences correspond to the terminal groups one by one.

Optionally, the first acquiring module includes:

a demodulating sub-module configured to demodulate the PDCCH respectively with each piece of the preset group-scrambling information; and a first acquiring sub-module configured to acquire the target common downlink control information in the case where the PDCCH is successfully demodulated with target preset group-scrambling information of the pieces of the preset group-scrambling information.

Optionally, the first acquiring module includes:

a first determining sub-module configured to: if the pieces of the preset group-scrambling information comprise the plurality of preset RNTIs, determine, from among the plurality of preset RNTIs, a target preset RNTI corresponding to the target terminal group to which the terminal belongs; and a second acquiring sub-module configured to demodulate the PDCCH according to the target preset RNTI to acquire the target common downlink control information.

Optionally, the first acquiring module includes:

a second determining sub-module configured to: if the pieces of the preset group-scrambling information comprise the preset RNTI and the plurality of preset scrambling sequences, determine, from among the plurality of the preset scrambling sequences, a target preset scrambling sequence corresponding to the target terminal group to which the terminal belongs; and a third acquiring sub-module configured to demodulate the PDCCH according to the preset RNTI and the target preset scrambling sequence to acquire the target common downlink control information.

Optionally, the apparatus further includes:

a second acquiring module configured to acquire the pieces of the preset group-scrambling information based on a pre-defined protocol for communication between the terminal and the base station; or a second receiving module configured to receive the pieces of the preset group-scrambling information transmitted by the base station via target signaling, where the target signaling comprises any of radio resource control signaling, system information, a MAC control element, and physical layer signaling.

According to a fifth aspect of examples of the present disclosure, a computer-readable storage medium is provided, where the storage medium stores a computer program for performing the method of transmitting the common downlink control information according to the first aspect.

According to a sixth aspect of examples of the present disclosure, a computer-readable storage medium is provided, where the storage medium stores a computer program for performing the method of acquiring the common downlink control information according to the second aspect.

According to a seventh aspect of examples of the present disclosure, an apparatus for transmitting common downlink control information is provided, which being applied to a base station and including:

a processor; and a memory for storing instructions executable by the processor;

where the processor is configured to:

group-scramble common downlink control information with pieces of preset group-scrambling information corresponding to terminal groups one by one to acquire grouped common downlink control information; and transmit a PDCCH carrying target common downlink control information to a terminal, so that the terminal demodulates the PDCCH according to the pieces of the preset group-scrambling information to acquire the target common downlink control information, where the target common downlink control information is common downlink control information of the grouped common downlink control information corresponding to a target terminal group to which the terminal belongs.

According to an eighth aspect of examples of the present disclosure, an apparatus for acquiring common downlink control information is provided, which being applied to a terminal and including:

a processor; and a memory for storing instructions executable by the processor;

where the processor is configured to:

receive a PDCCH carrying target common downlink control information from a base station, where the target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one; and demodulate the PDCCH according to the pieces of the preset group-scrambling information to acquire the target common downlink control information.

The technical solutions provided by the examples of the present disclosure may include the following beneficial effects.

In the examples of the present disclosure, the base station can group-scramble the common downlink control information with the pieces of the preset group-scrambling information corresponding to the terminal groups one by one to acquire the grouped common downlink control information. Further, the base station transmits, to the terminal, the PDCCH carrying the target common downlink control information, so that the terminal demodulates the PDCCH according to the pieces of the preset group-scrambling information to acquire the target common downlink control information. The target common downlink control information is common downlink control information of the grouped common downlink control information corresponding to a target terminal group to which the terminal belongs. Through the process, the purpose of transmitting the common downlink control information based on the terminal groups is achieved.

In the examples of the present disclosure, the pieces of the preset group-scrambling information may include a plurality of preset RNTIs corresponding to the terminal groups one by one. Or, the pieces of the preset group-scrambling information may include a preset RNTI and a plurality of preset scrambling sequences, where the plurality of preset scrambling sequences correspond to the terminal groups one by one. That is, the base station may group-scramble the common downlink control information with the plurality of the preset RNTIs, or the base station may scramble the common downlink control information with a unified preset RNTI, and then group-scramble the common downlink control information respectively with the plurality of the preset scrambling sequences. Through the process, the base station can acquire the group-scrambled common downlink control information, which is easy to implement and has high availability.

In the examples of the present disclosure, the base station can transmit the pieces of the preset group-scrambling information to the terminal via the target signaling. Optionally, the target signaling may include any of the followings: radio resource control signaling, system information, a MAC control element and physical layer signaling. Through the process, the base station can transmit the pieces of the preset group-scrambling information to the terminal, so that the terminal subsequently demodulates the received PDCCH according to the pieces of the preset group-scrambling information.

In the examples of the present disclosure, the terminal can receive, from the base station, the PDCCH carrying the target common downlink control information. The target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one. Further, the terminal can demodulate the PDCCH according to the pieces of the preset group-scrambling information to acquire the target common downlink control information. Through the process, the terminal acquires the target common downlink control information corresponding to the target terminal group to which the terminal belongs.

In the examples of the present disclosure, the terminal may demodulate the PDCCH respectively with each piece of the preset group-scrambling information, and the target preset group-scrambling information in the preset group-scrambling information can successfully demodulate the PDCCH, so as to acquire the target common downlink control information after demodulation. Through the process, the terminal can demodulate the PDCCH carrying the target common downlink control information with the pieces of the preset group-scrambling information to acquire the target common downlink control information.

In the examples of the present disclosure, the terminal may acquire the pieces of the preset group-scrambling information based on a pre-defined protocol for communication between the terminal and the base station. Or the terminal may receive the pieces of the preset group-scrambling information transmitted by the base station via target signaling. Through the process, the terminal can acquire the pieces of the preset scrambling information, so as to subsequently demodulate the PDCCH according to the pieces of the preset scrambling information and acquire the target common downlink control information corresponding to the target terminal group to which the terminal belongs.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1:
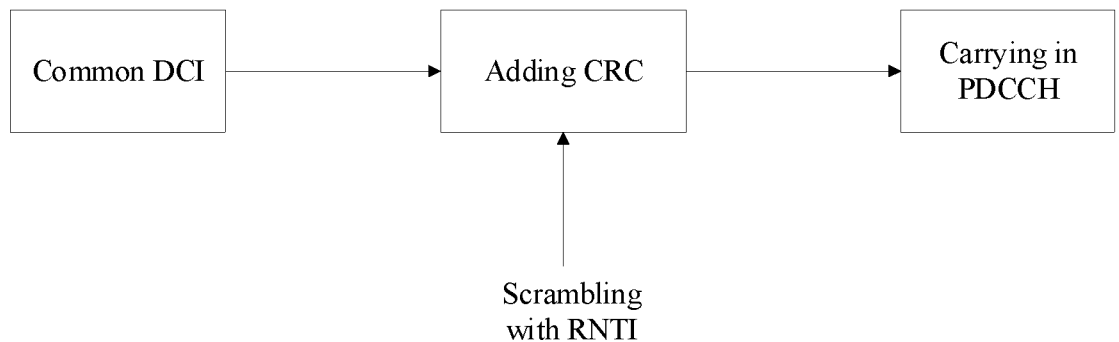
FIG. 1 is a schematic diagram illustrating a transmission scenario of common downlink control information according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein may be interpreted as "when" or "upon" or "in response to determining".

In the related art, as shown in FIG. 1, a base station may add a CRC (Cyclic Redundancy Check) code to common Downlink Control Information (DCI), so that a terminal checks whether the common DCI is correct according to the CRC code. After adding the CRC code, the base station can scramble the CRC code according to a preset scrambling algorithm by using a common Radio Network Temporary Identifier (RNTI) of a cell, that is, the common DCI is scrambled by using the common RNTI, so that a plurality of terminals in the cell can receive the common DCI. However, the above-described situation cannot be applied to a case where grouped common DCI is transmitted and acquired for a terminal group.

Figure 2:
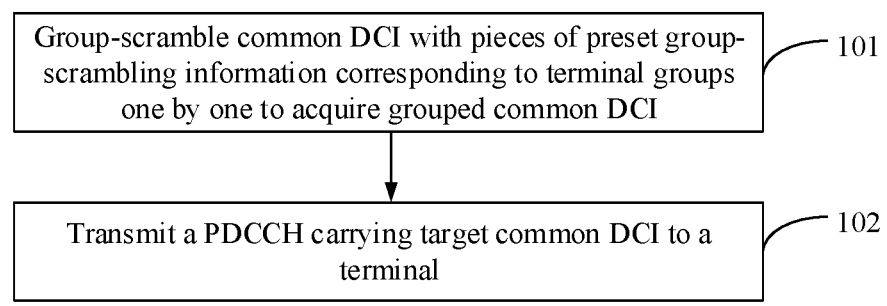
FIG. 2 is a flowchart illustrating a method of transmitting common downlink control information according to an example.

In order to solve the above problem, a method of transmitting common DCI is provided by examples of the present disclosure, which may be applied to a base station. FIG. 2 is a flowchart illustrating a method of transmitting common DCI according to an example, which can include the following steps.

At step 101, common DCI is group-scrambled by using pieces of preset group-scrambling information corresponding to terminal groups one by one to acquire grouped common DCI.

At step 102, a PDCCH carrying target common DCI is transmitted to a terminal, so that the terminal demodulates the PDCCH according to the pieces of the preset group-scrambling information to acquire the target common DCI.

The target common DCI is common DCI in the grouped common DCI corresponding to a target terminal group to which the terminal belongs.

In the example, a base station may group-scramble common DCI with pieces of preset group-scrambling information corresponding to terminal groups one by one to acquire grouped common DCI. Further, the base station transmits a PDCCH carrying target common DCI to a terminal. The terminal demodulates the PDCCH according to the pieces of the preset group-scrambling information to acquire the target common DCI. The target common DCI is common DCI of the grouped common DCI corresponding to the target terminal group to which the terminal belongs. Through the process, the purpose of transmitting the group-scrambled common DCI is achieved.

For step 101, a process of group-scrambling the common DCI with the pieces of the preset group-scrambling information to acquire the grouped common DCI is as follows.

In a first case, the pieces of the preset group-scrambling information include a plurality of preset RNTIs, where the RNTIs correspond to the terminal groups one by one.

In this case, the pieces of the preset group-scrambling information may be as shown in Table 1.

TABLE 1

| Group number of terminal groups | Value of RNTIs |
|---|---|
| Group 1 | RNTI_1 |
| Group 2 | RNTI_2 |
| ... | ... |
| Group N | RNTI_N |

The base station may scramble the common DCI according to groups shown in Table 1 by using the related art. A scrambling process is to group-scramble the CRC codes added to the common DCI with the RNTIs corresponding to different terminal groups in Table 1. For example, with respect to terminal group 1, the CRC code is scrambled by using RNTI_1 to acquire common DCI_1; with respect to terminal group 2, the CRC code is scrambled by using RNTI_2 to acquire common DCI_2; ...; and with respect to terminal group N, the CRC code is scrambled by using RNTI_N to acquire common DCI_N. Common DCI_1, common DCI 2, ..., and common DCI_N constitute the grouped common DCI.

In a second case, the pieces of the preset group-scrambling information include a preset RNTI and a plurality of preset scrambling sequences, where the plurality of the preset scrambling sequences correspond to the terminal groups one by one.

In this case, the pieces of the preset group-scrambling information may be as shown in Table 2.

TABLE 2

| Group number of terminal groups | Preset scrambling sequences |
|---|---|
| Group 1 | Scrambling sequence 1 |
| Group 2 | Scrambling sequence 2 |
| ... | ... |
| Group N | Scrambling sequence N |

Figure 3:
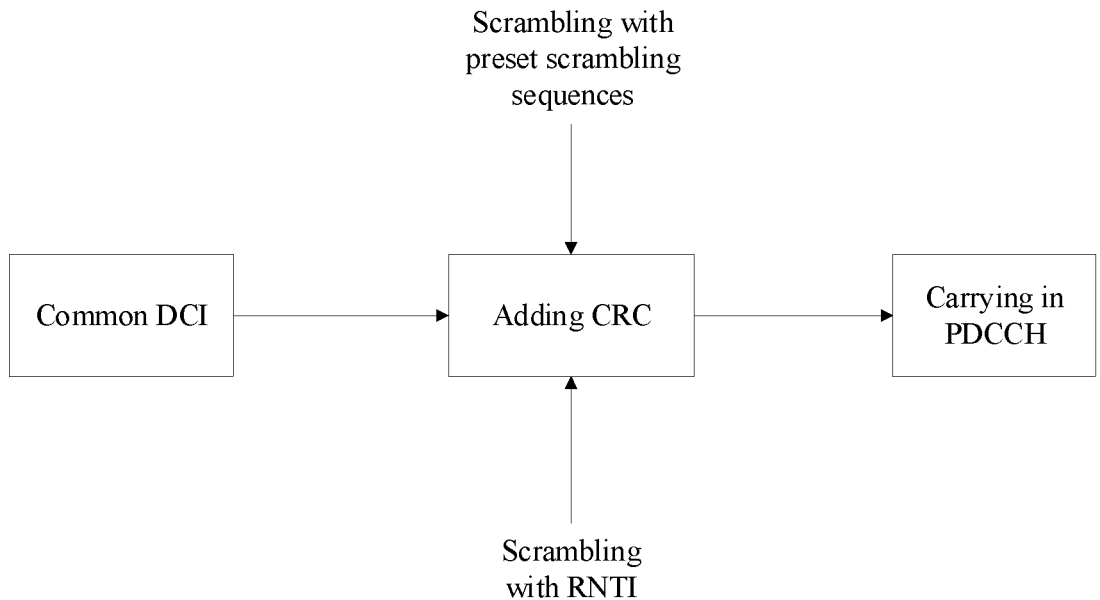
FIG. 3 is a schematic diagram illustrating another transmission scenario of common downlink control information according to an example.

As shown in FIG. 3, the base station may perform a first scrambling on the common DCI by using the preset RNTI based on the related art, and further, perform a second scrambling on the common DCI subjected to the first scrambling according to groups shown in table 2. That is, after a first scrambling is performed on the CRC code added to the common DCI with the preset RNTI, a second scrambling is performed on the CRC code with scrambling sequences corresponding to different terminal groups respectively. For example, with respect to terminal group 1, the second scrambling is performed on the CRC code subjected to the first scrambling by using scrambling sequence 1, so as to acquire common DCI_1; with respect to terminal group 2, the second scrambling is performed on the CRC code subjected to the first scrambling by using scrambling sequence 2, so as to acquire common DCI_2; ...; and with respect to terminal group N, the second scrambling is performed on the CRC code subjected to the first scrambling by using scrambling sequence N, so as to acquire common DCI_N. Common DCI_1, common DCI_2, ..., and common DCI_N also constitute the grouped common DCI. A scrambling process corresponding to each terminal group is the same as the scrambling process in the related art.

For step 102, the base station may use a corresponding PDCCH to carry the grouped common DCI based on the related art. For example, common DCI_1 in the grouped common DCI is carried on a PDCCH_L, common DCI_2 in the grouped common DCI is carried on a PDCCH_M, ....

In examples of the present disclosure, the base station may transmit the target common DCI carried on the PDCCH, where the target common DCI corresponds to a target terminal group to which each terminal belongs.

For a terminal, according to the division of the terminal groups, for example, if the terminal groups are divided according to geographical locations, the terminal may receive, sent by a base station, only a PDCCH carrying a piece of target common DCI corresponding to a target terminal group to which the terminal belongs. At this time, the terminal may demodulate the PDCCH according to the preset group-scrambling information to acquire the target common DCI.

The terminal may also receive a plurality of PDCCHs carrying pieces of common DCI corresponding to different terminal groups at the same time. Or, if the terminal is to work under a plurality of the terminal groups, the terminal also needs to receive pieces of common DCI corresponding to the plurality of the terminal groups. At this time, the terminal may determine, from the plurality of the PDCCHs, a target PDCCH corresponding to a target terminal group to which the terminal belongs, and then demodulate the target PDCCH according to the preset group-scrambling information, so as to acquire the target common DCI.

Figure 4:
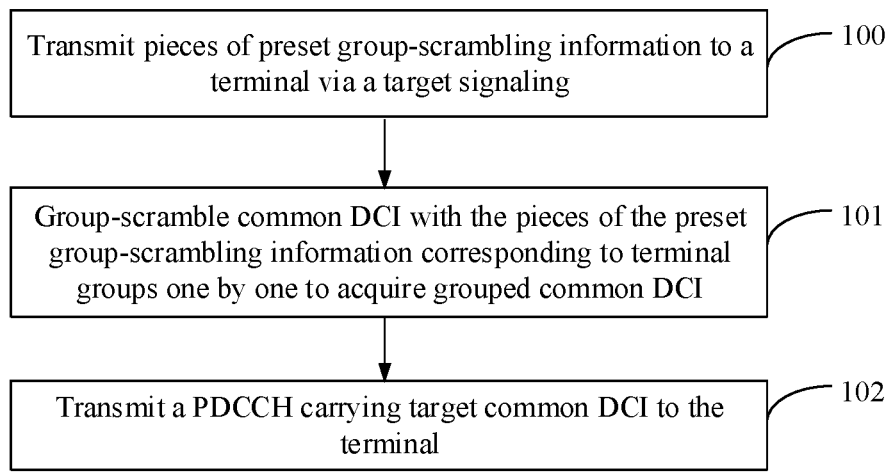
FIG. 4 is a flowchart illustrating another method of transmitting common downlink control information according to an example.

In an example, referring to FIG. 4, which is a flowchart illustrating another method of transmitting common DCI according to the example shown in FIG. 2, the method of transmitting the common DCI may further include:

at step 100, the preset group-scrambling information is transmitted to the terminal via target signaling.

In the step, the base station can transmit the preset group-scrambling information to the terminal via the target signaling. Optionally, the target signaling includes any of the following: RRC (Radio Resource Control) signaling, system information, a MAC (Medium Access Control) CE (Control Element) and physical layer signaling.

In examples of the present disclosure, the base station may transmit the preset group-scrambling information to the terminal via RRC signaling, when transmitting the RRC signaling to the terminal.

The base station may carry the pieces of the preset group-scrambling information in a broadcast system information, so that the terminal receives the pieces of the preset group-scrambling information.

The base station may further transmit the pieces of the preset group-scrambling information to the terminal via the MAC CE.

The physical layer signaling is signaling carried by the PDCCH, for example, TFCI (Transport Format Combination Indicator) signaling for indicating a transmission format, TPC (Transmit Power Control) signaling for power control, and so on. In examples of the present disclosure, the base station may further transmit the pieces of the preset group-scrambling information to the terminal via the physical layer signaling.

After the base station transmits the pieces of the preset group-scrambling information to the terminal, the terminal may demodulate the PDCCH according to the pieces of the preset group-scrambling information, so as to acquire the target common DCI.

In the example, the base station may transmit the pieces of the preset group-scrambling information to the terminal via the target signaling, so that after receiving the PDCCH, the terminal demodulates the PDCCH according to the preset group-scrambling information.

Figure 5:
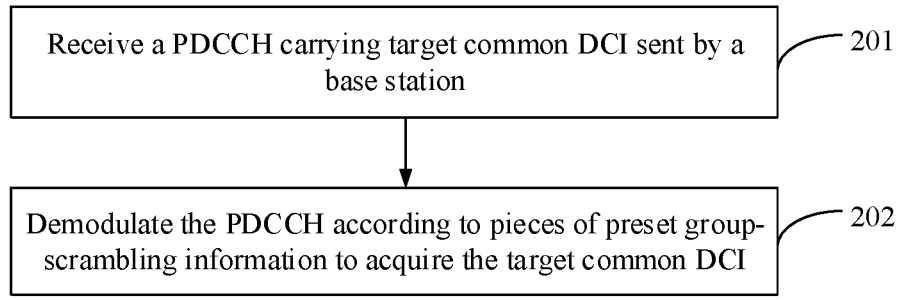
FIG. 5 is a flowchart illustrating a method of acquiring common downlink control information according to an example.

A method of acquiring common DCI is also provided by examples of the present disclosure, which may be applied to a terminal. FIG. 5 is a flowchart illustrating a method of acquiring common DCI according to an example, which may include the following steps.

At step 201, a PDCCH carrying target common DCI sent by a base station is received. The target common DCI is common DCI of grouped common DCI corresponding to a target terminal group to which the terminal belongs. The grouped common DCI is groups of common DCI acquired by the base station group-scrambling the common DCI with pieces of preset group-scrambling information corresponding to terminal groups one by one.

At step 202, the PDCCH is demodulated according to the pieces of the preset group-scrambling information to acquire the target common DCI.

In the example, the terminal may receive the PDCCH carrying the target common DCI sent by the base station. The target common DCI is common DCI of the grouped common DCI corresponding to a target terminal group to which the terminal belongs. The grouped common DCI is groups of common DCI acquired by the base station group-scrambling the common DCI with the pieces of the preset group-scrambling information corresponding to the terminal groups one by one. Further, the terminal may demodulate the PDCCH according to the pieces of the preset group-scrambling information, so as to acquire the target common DCI. Through the process, it can achieve the purpose of the terminal acquiring the target common DCI corresponding to the target terminal group to which the terminal belongs.

For step 201, the terminal receives, from the base station, the PDCCH carrying the target common DCI directly based on the related art. The target common DCI is common DCI of grouped common DCI corresponding to a target terminal group to which the terminal belongs. The grouped common DCI is groups of common DCI acquired by the base station group-scrambling the common DCI with pieces of preset group-scrambling information corresponding to terminal groups one by one.

For step 202, optionally, the pieces of the preset group-scrambling information may include:

a plurality of preset RNTIs, where the preset RNTIs correspond to the terminal groups one by one; or a preset RNTI and a plurality of preset scrambling sequences, where the plurality of preset scrambling sequences correspond to the terminal groups one by one.

The plurality of the preset RNTIs may be as shown in Table 1. The plurality of the preset scrambling sequences may be as shown in Table 2.

Figure 6:
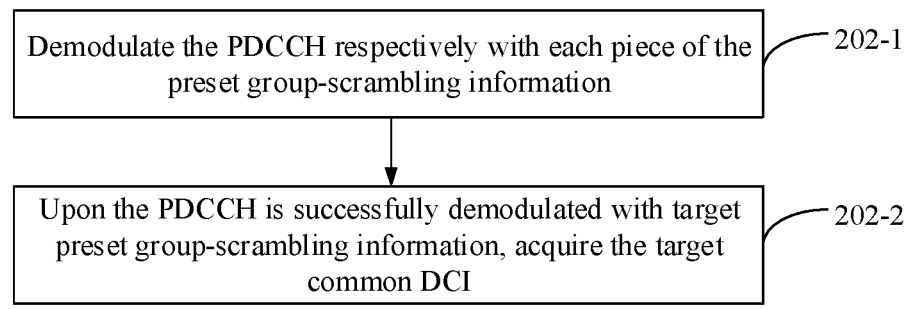
FIG. 6 is a flowchart illustrating another method of acquiring common downlink control information according to an example.

FIG. 6 is a flowchart illustrating another method of acquiring common DCI according to the example as shown in FIG. 5. As shown in FIG. 6, step 202 may include the following steps.

At step 202-1, the PDCCH is demodulated respectively with each piece of the preset group-scrambling information.

In this step, the terminal may demodulate the PDCCH respectively by using the preset group-scrambling information.

Taking the preset group-scrambling information including the plurality of the preset RNTIs as an example. According to a correspondence in Table 1, the terminal can demodulate the PDCCH based on the related art by using RNTI_1, RNTI_2, . . . , RNTI_N, respectively.

Taking the preset group-scrambling information including the preset RNTI and the plurality of the preset scrambling sequences as an example. According to a correspondence in Table 2 and on the basis of the known preset RNTI, the terminal can demodulate the PDCCH based on the related art by using the preset RNTI and scrambling sequence 1, the preset RNTI and scrambling sequence 2, . . . , the preset RNTI and scrambling sequence N respectively.

At step 202-2, upon the PDCCH is successfully demodulated by using target preset group-scrambling information, the target common DCI is acquired. The target preset group-scrambling information is a piece of the preset group-scrambling information.

In this step, the target preset group-scrambling information in the preset group-scrambling information may successfully demodulate the PDCCH to acquire the target common DCI.

For example, RNTI_2 in the plurality of the preset RNTIs may successfully demodulate the PDCCH, and thus, the terminal may acquire the target common DCI carried in the PDCCH. For example, the preset RNTI and scrambling sequence 3 in the plurality of the preset scrambling sequences may successfully demodulate the PDCCH, and thus, the terminal may also acquire the target common DCI carried in the PDCCH.

For the terminal, it is also possible to simultaneously receive a plurality of PDCCHs carrying different pieces of grouped common DCI. Or because the terminal belongs to a plurality of terminal groups, the terminal is to receive a plurality of PDCCHs carrying different pieces of the grouped common DCI. In this case, the terminal determines, from the plurality of the PDCCHs, a target PDCCH corresponding to a target terminal group to which the terminal belongs, and then demodulates the target PDCCH according to the preset group-scrambling information, so as to acquire the target common DCI. The target terminal group may be pre-stored by the terminal, or transmitted from the base station to the terminal via a target signaling.

Figure 7:
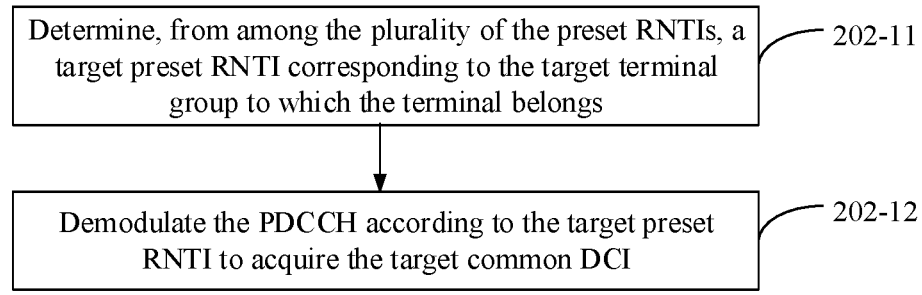
FIG. 7 is a flowchart illustrating another method of acquiring common downlink control information according to an example.

FIG. 7 is a flowchart illustrating another method of acquiring common DCI according to the example as shown in FIG. 5. In an example, optionally, when the preset group-scrambling information includes the plurality of the preset RNTIs, as shown in FIG. 7, step 202 may include the followings.

At step 202-11, a target preset RNTI corresponding to the target terminal group to which the terminal belongs is determined from among the plurality of the preset RNTIs.

In examples of the present disclosure, terminal grouping may be performed according to a service type of the terminal, a transmission feature of the terminal, or the like. For example, when the grouping is performed according to the service type, the terminal can be grouped based on different service type support, such as supporting an EMBB (Enhance Mobile Broadband) service and supporting a URLLC (Ultra Reliable & Low Latency Communication) service.

When the grouping is performed according to the transmission feature, the terminal can be grouped based on the followings: different directions of beams transmitted from a base station corresponding to the terminal when the base station performs beam sweeping in a current cell, or different lengths of cyclic prefixes, or different time intervals for the terminal to respond after receiving various requests from a network side, or the like.

In the step, the terminal has pre-stored the target terminal group to which the terminal belongs or has received the target terminal group via the target signaling sent by the base station. Thus, the terminal may determine, from among the plurality of the preset RNTIs corresponding to the terminal groups respectively, a target preset RNTI corresponding to the target terminal group.

For example, the terminals are divided into two terminal groups, supporting the EMBB service and supporting the URLLC service, according to the service type. A terminal supporting the EMBB service belongs to group 1, and a terminal supporting the URLLC service belongs to group 2. According to Table 1, the terminal supporting the EMBB service may determine that the target preset RNTI corresponding to the target terminal group to which the terminal itself belongs is RNTI_1. According to Table 1, the terminal supporting the URLLC service may determine that the target preset RNTI corresponding to the target terminal group to which the terminal itself belongs is RNTI_2.

At step 202-12, the PDCCH is demodulated according to the target preset RNTI to acquire the target common DCI.

In this step, the terminal does not need to demodulate the PDCCH respectively by using a plurality of the preset RNTIs, and can demodulate the PDCCH directly only by using the target preset RNTI, so as to acquire the target common DCI.

In the example, the terminal may determine, from the plurality of the preset RNTIs, a corresponding target preset RNTI according to the target terminal group to which the terminal belongs, and then demodulate the PDCCH only by using the target preset RNTI to acquire the target common DCI. Through the process, the target common DCI corresponding to the target terminal group to which the terminal belongs may be acquired more quickly, and the availability thereof is high.

Figure 8:
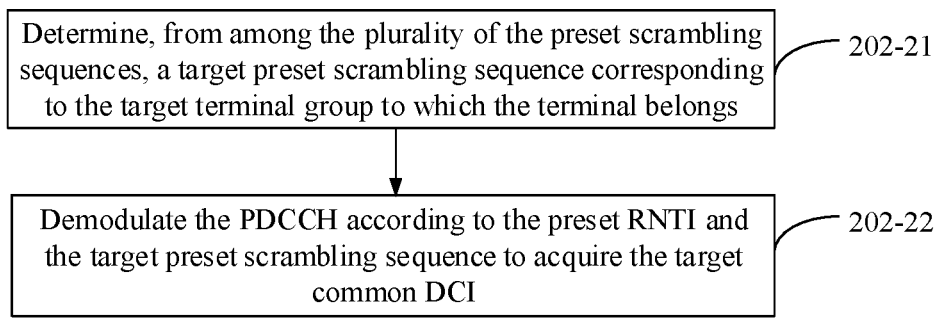
FIG. 8 is a flowchart illustrating another method of acquiring common downlink control information according to an example.

FIG. 8 is a flowchart illustrating another method of acquiring common DCI according to the example as shown in FIG. 5. In an example, optionally, when the preset group-scrambling information includes the preset RNTI and the plurality of the preset scrambling sequences, as shown in FIG. 8, step 202 may include the followings.

At step 202-21, a target preset scrambling sequence corresponding to the target terminal group to which the terminal belongs is determined from among the plurality of the preset scrambling sequences.

In this step, similarly, the terminal may determine a corresponding target preset scrambling sequence from Table 2 according to the target terminal group to which the terminal belongs.

For example, the terminals are divided into two terminal groups, supporting the EMBB service and supporting the URLLC service, according to the service type. A terminal supporting the EMBB service belongs to group 1, and a terminal supporting the URLLC service belongs to group 2. According to Table 2, the terminal supporting the EMBB service may determine that the target preset scrambling sequence corresponding to the target terminal group to which the terminal itself belongs is scrambling sequence 1. According to Table 2, the terminal supporting the URLLC service may determine that the target preset scrambling sequence corresponding to the target terminal group to which the terminal itself belongs is scrambling sequence 2.

At step 202-22, the PDCCH is demodulated according to the preset RNTI and the target preset scrambling sequence to acquire the target common DCI.

In this step, the terminal does not need to demodulate the PDCCH respectively sequentially by using the preset RNTI and the plurality of the preset scrambling sequences, and can demodulate the PDCCH directly only by using the preset RNTI and the target preset scrambling sequence, so as to acquire the target common DCI.

In the example, the terminal may determine, from among the plurality of the preset scrambling sequences, a corresponding target preset scrambling sequence according to the target terminal group to which the terminal belongs, and then demodulate the PDCCH only by using the preset RNTI and the target preset scrambling sequence to acquire the target common DCI. Through the process, the target common DCI corresponding to the target terminal group to which the terminal belongs may be acquired more quickly, and the availability thereof is high.

In an example, the terminal may acquire the preset group-scrambling information in advance in any of the following manners.

In a first manner, the preset group-scrambling information is acquired from a pre-defined protocol for communication.

In this manner, the preset group-scrambling information may be written into a 5G communication protocol. The terminal can acquire the preset group-scrambling information directly based on the pre-defined protocol for communication between the terminal and the base station prior to performing step 202.

In a second manner, the terminal may receive the preset group-scrambling information via target signaling sent by the base station. Optionally, the target signaling includes any of the followings: RRC signaling, system information, a MAC control element and physical layer signaling.

In this manner, prior to performing step 202, the terminal may acquire the preset group-scrambling information via the target signaling sent by the base station.

In the example, the terminal may acquire the preset group-scrambling information directly according to the pre-defined communication protocol between the terminal and the base station, or the terminal may receive, the preset group-scrambling information via a target signaling sent by the base station. Thus, the implementation thereof is easy and the availability thereof is high.

Figure 9:
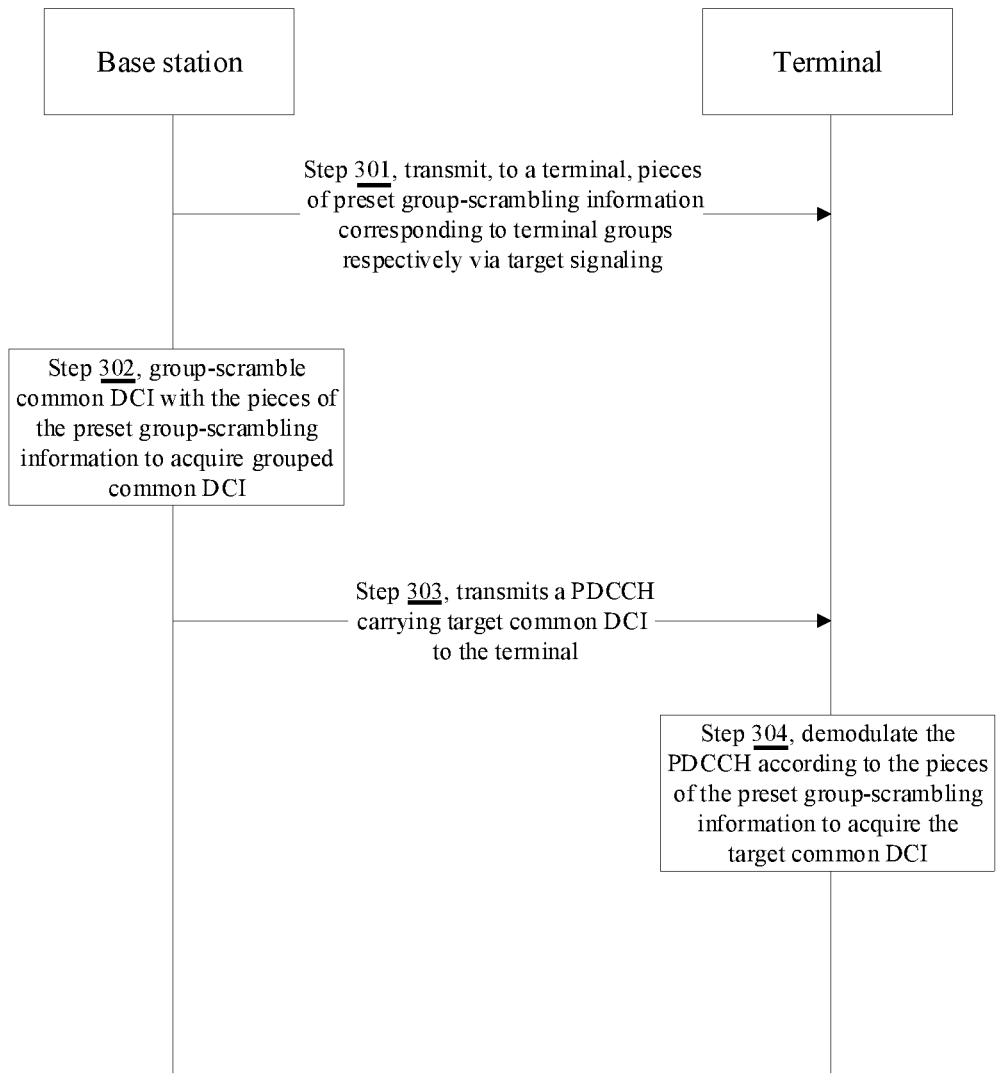
FIG. 9 is a flowchart illustrating a method of transmitting and acquiring common downlink control information according to an example.

FIG. 9 is a flowchart illustrating a method of transmitting and acquiring common DCI according to an example, which may include the following steps.

At step 301, a base station transmits, to a terminal, pieces of preset group-scrambling information corresponding to terminal groups one by one via target signaling.

At step 302, the base station group-scrambles common DCI by using the pieces of the preset group-scrambling information to acquire grouped common DCI.

At step 303, the base station transmits a PDCCH carrying target common DCI to the terminal.

The target common DCI is common DCI of the grouped common DCI corresponding to a target terminal group to which the terminal belongs.

At step 304, the terminal demodulates the PDCCH according to the pieces of the preset group-scrambling information to acquire the target common DCI.

In the example, the base station group-scrambles the common DCI with the pieces of the preset group-scrambling information, so as to acquire the grouped common DCI. After receiving the PDCCH carrying the target common DCI sent by the base station, the terminal demodulates the PDCCH sequentially according to the pieces of the preset group-scrambling information that has been received in advance until the demodulation is successful, then the terminal acquires the target common DCI. Through the process, when the common DCI is transmitted based on groups, the terminal can correctly demodulate and acquire the target common DCI corresponding to the target terminal group to which the terminal itself belongs.

In the examples of the present disclosure, in addition to the method, another method of transmitting and acquiring common DCI is provided.

A base station may scramble common DCI directly by using a preset RNTI based on the related art to acquire scrambled common DCI. Further, a PDCCH carrying the scrambled common DCI may be transmitted to a terminal in a target preset transmission manner. The target preset transmission manner is a preset transmission manner corresponding to a target terminal group.

Optionally, the preset transmission manner may include at least one of the following:

performing transmission via time domain and frequency domain resources corresponding to the terminal groups one by one;

encoding the PDCCH in encoding manners corresponding to the terminal groups one by one; and performing transmission via beams corresponding to the terminal groups one by one.

In examples of the present disclosure, the base station can have different time domain and frequency domain resources. The time domain resource may be a slot, a sub-frame, an OFDM (Orthogonal Frequency Division Multiplexing) symbol, or the like. The frequency domain resource may be a sub-carrier, a PRB (physical resource block), or the like.

Figure 10A:
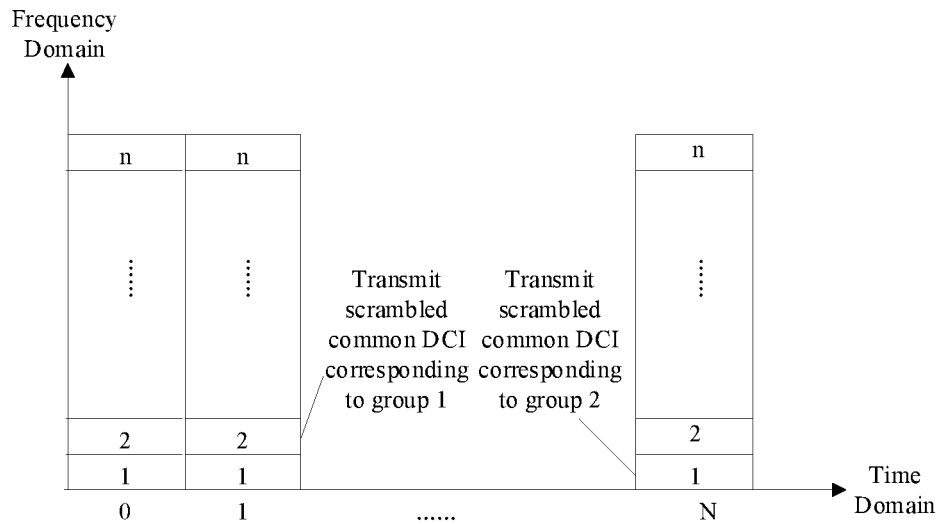
FIGS. 10A and 10B are schematic diagrams illustrating a transmission scenario of common downlink control information according to an example.

For example, as shown in FIG. 10A, pieces of the scrambled common DCI corresponding to different terminal groups are transmitted in different time domain units and frequency domain units.

In addition, the base station may also adopt different encoding manners for the PDCCH according to different terminal groups. Assume that encoding manner 1 is adopted for PDCCH_1 corresponding to group 1, and encoding manner 2 is adopted for PDCCH_2 corresponding to group 2, and so on.

Figure 10B:
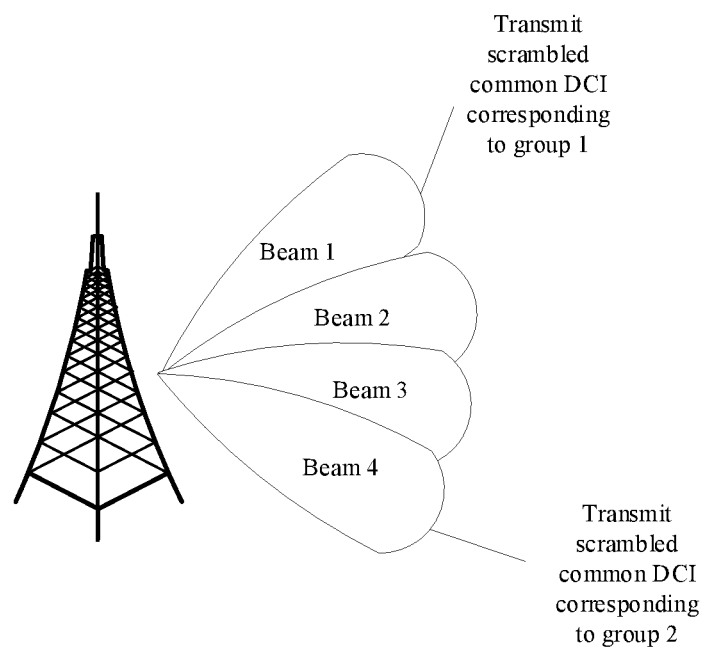

Alternatively, the base station may transmit, on different beams, the scrambled common DCI corresponding to different terminal groups, as shown in FIG. 10B.

In the example of the present disclosure, the base station may transmit the preset transmission manners to the terminal via a target signaling. The terminal may determine, from the preset transmission manners, a target preset transmission manner corresponding to the target terminal group to which the terminal belongs. The terminal pre-stores the target terminal group, or the base station transmits the target terminal group to the terminal via a target signaling.

After receiving the PDCCH, the terminal can demodulate the PDCCH by using a preset RNTI, and acquire, at a target location indicated by the target transmission manner, the target common DCI corresponding to the target terminal group to which the terminal belongs.

For example, after the terminal demodulates the PDCCH by using the preset RNTI, information corresponding to a carrier on a sub-frame indicated by the target transmission manner is the target common DCI.

In the example, after scrambling the common DCI by using the RNTI to acquire the scrambled common DCI, the base station can transmit the PDCCH carrying the scrambled common DCI to the terminal in the target preset transmission manner. The purpose of transmitting the group-scrambled common DCI is also achieved. After receiving, from the base station, the PDCCH carrying the scrambled common DCI in the target preset transmission manner, the terminal may first demodulate the PDCCH by using the preset RNTI. Further, the terminal searches for a target location in the demodulated PDCCH carrying the scrambled common DCI according to the target preset transmission manner, and acquires the target common DCI corresponding to the target terminal group. Through the process, the terminal also achieves the purpose of acquiring the target common DCI corresponding to the target terminal group to which the terminal belongs.

Corresponding to the above application function implementation method examples, the present disclosure also provides application function implementation apparatus and corresponding terminal examples.

Figure 11:
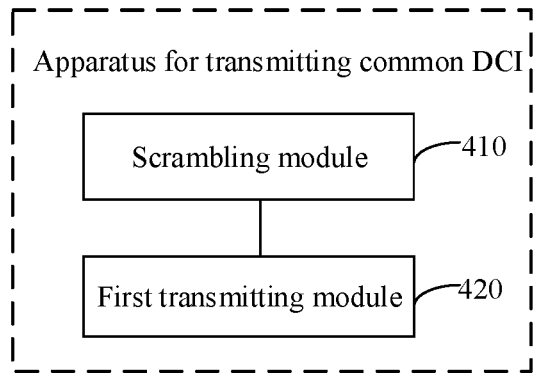
FIG. 11 is a block diagram illustrating an apparatus for transmitting common downlink control information according to an example.

FIG. 11 is a block diagram illustrating an apparatus for transmitting common DCI according to an example, which is applied to a base station, and includes:

a scrambling module 410, configured to group-scramble common DCI with pieces of preset group-scrambling information corresponding to terminal groups one by one to acquire grouped common DCI; and a first transmitting module 420, configured to transmit a PDCCH carrying target common DCI to a terminal, so that the terminal demodulates the PDCCH according to the pieces of the preset group-scrambling information to acquire the target common DCI, where the target common DCI is common DCI of the grouped common DCI corresponding to a target terminal group to which the terminal belongs.

Optionally, the pieces of the preset group-scrambling information include:

a plurality of preset RNTIs corresponding to the terminal groups one by one; or a preset RNTI and a plurality of preset scrambling sequences, where the plurality of preset scrambling sequences correspond to the terminal groups one by one.

Figure 12:
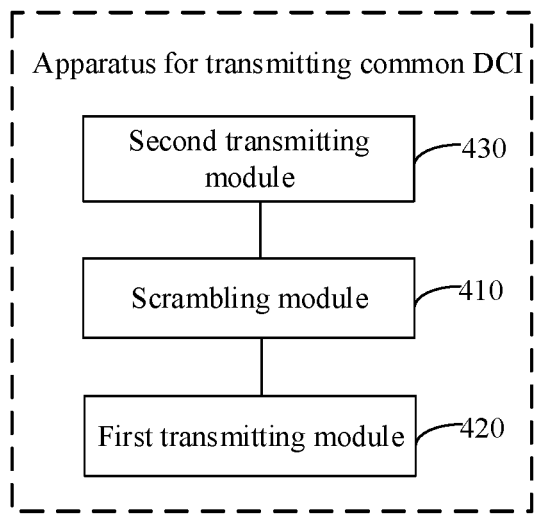
FIG. 12 is a block diagram illustrating another apparatus for transmitting common downlink control information according to an example.

FIG. 12 is a block diagram illustrating another apparatus for transmitting common DCI according to the example as shown in FIG. 11, which further includes:

a second transmitting module 430, configured to transmit the pieces of the preset group-scrambling information to the terminal via target signaling, where the target signaling comprises any of radio resource control signaling, system information, a MAC control element, and physical layer signaling.

Figure 13:
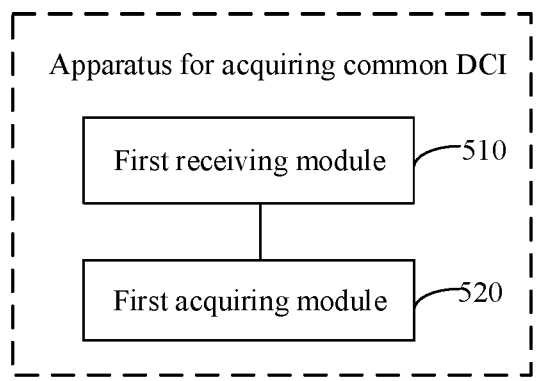
FIG. 13 is a block diagram illustrating an apparatus for acquiring common downlink control information according to an example.

FIG. 13 is a block diagram illustrating an apparatus for acquiring common DCI according to an example, which is applied to a terminal, and includes:

a first receiving module 510, configured to receive a PDCCH carrying target common DCI from a base station, where the target common DCI is common DCI of grouped common DCI corresponding to a target terminal group to which the terminal belongs, and the grouped common DCI is groups of common DCI acquired by the base station group-scrambling common DCI with pieces of preset group-scrambling information corresponding to terminal groups one by one; and a first acquiring module 520, configured to demodulate the PDCCH according to the pieces of the preset group-scrambling information to acquire the target common DCI.

Optionally, the pieces of the preset group-scrambling information include:

a plurality of preset RNTIs corresponding to the terminal groups one by one; or a preset RNTI and a plurality of preset scrambling sequences, where the plurality of preset scrambling sequences correspond to the terminal groups one by one.

Figure 14:
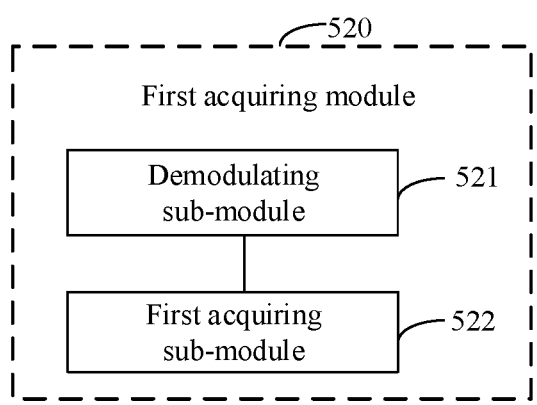
FIG. 14 is a block diagram illustrating another apparatus for acquiring common downlink control information according to an example.

FIG. 14 is a block diagram illustrating another apparatus for acquiring common DCI according to the example as shown in FIG. 13. The first acquiring module 520 includes:

a demodulating sub-module 521, configured to demodulate the PDCCH respectively with each piece of the preset group-scrambling information; and a first acquiring sub-module 522, configured to acquire the target common DCI in the case where the PDCCH is successfully demodulated with target preset group-scrambling information of the pieces of the preset group-scrambling information.

Figure 15:
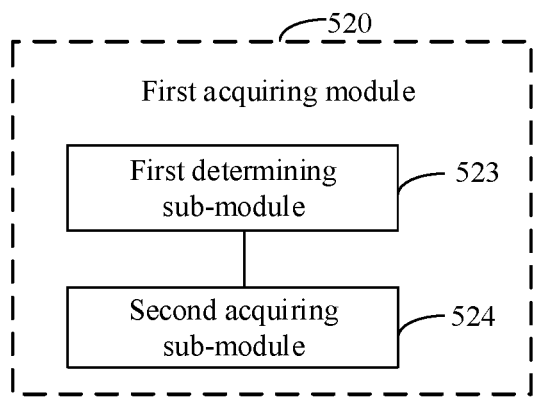
FIG. 15 is a block diagram illustrating another apparatus for acquiring common downlink control information according to an example.

FIG. 15 is a block diagram illustrating another apparatus for acquiring common DCI according to the example as shown in FIG. 13. The first acquiring module 520 includes:

a first determining sub-module 523, configured to: if the pieces of the preset group-scrambling information comprise the plurality of preset RNTIs, determine, from among the plurality of preset RNTIs, a target preset RNTI corresponding to the target terminal group to which the terminal belongs; and a second acquiring sub-module 524, configured to demodulate the PDCCH according to the target preset RNTI to acquire the target common DCI.

Figure 16:
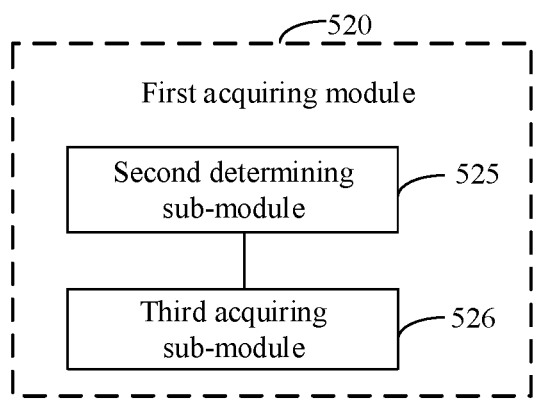
FIG. 16 is a block diagram illustrating another apparatus for acquiring common downlink control information according to an example.

FIG. 16 is a block diagram illustrating another apparatus for acquiring common DCI according to the example as shown in FIG. 13. The first acquiring module 520 includes:

a second determining sub-module 525, configured to: if the pieces of the preset group-scrambling information comprise the preset RNTI and the plurality of preset scrambling sequences, determine, from among the plurality of the preset scrambling sequences, a target preset scrambling sequence corresponding to the target terminal group to which the terminal belongs; and a third acquiring sub-module 526, configured to demodulate the PDCCH according to the preset RNTI and the target preset scrambling sequence to acquire the target common DCI.

Figure 17A:
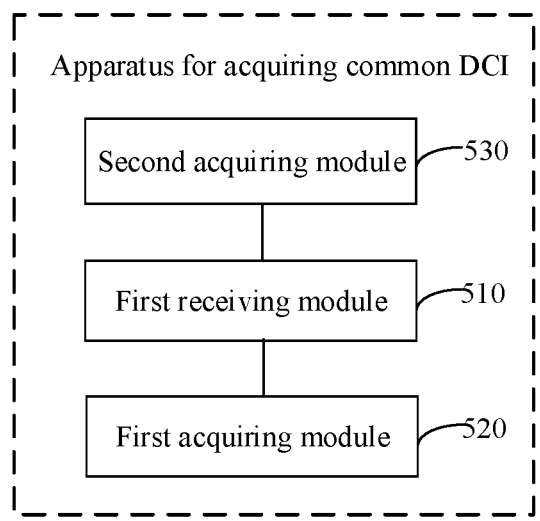
FIGS. 17A and 17B are block diagrams illustrating an apparatus for acquiring common downlink control information according to an example.

FIG. 17A is a block diagram illustrating another apparatus for acquiring common DCI according to the example as shown in FIG. 13, which further includes:

a second acquiring module 530, configured to acquire the pieces of the preset group-scrambling information based on a pre-defined protocol for communication between the terminal and the base station.

Figure 17B:
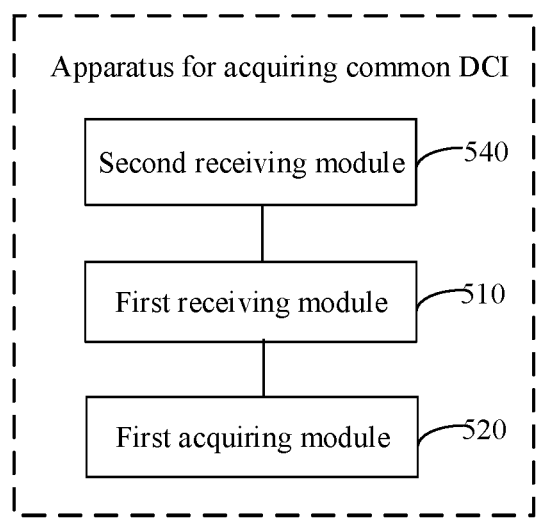

FIG. 17B is a block diagram illustrating another apparatus for acquiring common DCI according to the example as shown in FIG. 13, which further includes:

a second receiving module 540, configured to receive the pieces of the preset group-scrambling information transmitted by the base station via target signaling, where the target signaling comprises any of radio resource control signaling, system information, a MAC control element, and physical layer signaling.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure.

Those of ordinary skill in the art can understand and implement the present disclosure without any creative effort.

Correspondingly, a computer-readable storage medium is further provided by an example of the present disclosure, where the storage medium stores a computer program for performing any of the methods for transmitting the common DCI as described above.

Correspondingly, a computer-readable storage medium is further provided by an example of the present disclosure, where the storage medium stores a computer program for performing any of the methods for acquiring the common DCI as described above.

Correspondingly, an example of the present disclosure further provides an apparatus for transmitting common DCI, which is applied to a base station, and includes:

a processor; and a memory for storing instructions executable by the processor;

where the processor is configured to:

group-scramble common DCI with pieces of preset group-scrambling information corresponding to terminal groups one by one to acquire grouped common DCI; and transmit a PDCCH carrying target common DCI to a terminal, so that the terminal demodulates the PDCCH according to the pieces of the preset group-scrambling information to acquire the target common DCI, where the target common DCI is common DCI of the grouped common DCI corresponding to a target terminal group to which the terminal belongs.

Figure 18:
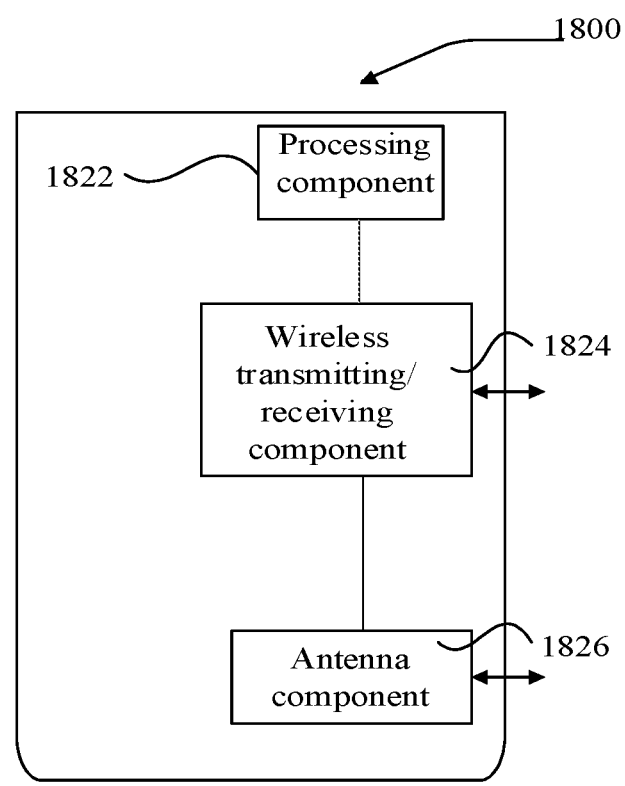
FIG. 18 is a structural diagram illustrating an apparatus for transmitting common downlink control information according to an example of the present disclosure.

FIG. 18 is a structural diagram illustrating an apparatus 1800 for transmitting common DCI according to an example. The apparatus 1800 may be provided as a base station. Referring to FIG. 18, the apparatus 1800 includes a processing component 1822, a wireless transmitting/receiving component 1824, an antenna component 1826, and a signal processing portion specific to a wireless interface. The processing component 1822 may further include one or more processors.

One of the processors in the processing component 1822 may be configured to:

group-scramble common DCI with pieces of preset group-scrambling information corresponding to terminal groups one by one to acquire grouped common DCI; and transmit a PDCCH carrying target common DCI to a terminal, so that the terminal demodulates the PDCCH according to the pieces of the preset group-scrambling information to acquire the target common DCI, where the target common DCI is common DCI of the grouped common DCI corresponding to a target terminal group to which the terminal belongs.

Correspondingly, an example of the present disclosure further provides an apparatus for acquiring common DCI, which is applied to a terminal, and includes:

a processor; and a memory for storing instructions executable by the processor;

where the processor is configured to:

receive a PDCCH carrying target common DCI from a base station, where the target common DCI is common DCI of grouped common DCI corresponding to a target terminal group to which the terminal belongs, and the grouped common DCI is groups of common DCI acquired by the base station group-scrambling common DCI with pieces of preset group-scrambling information corresponding to terminal groups one by one; and demodulate the PDCCH according to the pieces of the preset group-scrambling information to acquire the target common DCI.

Figure 19:
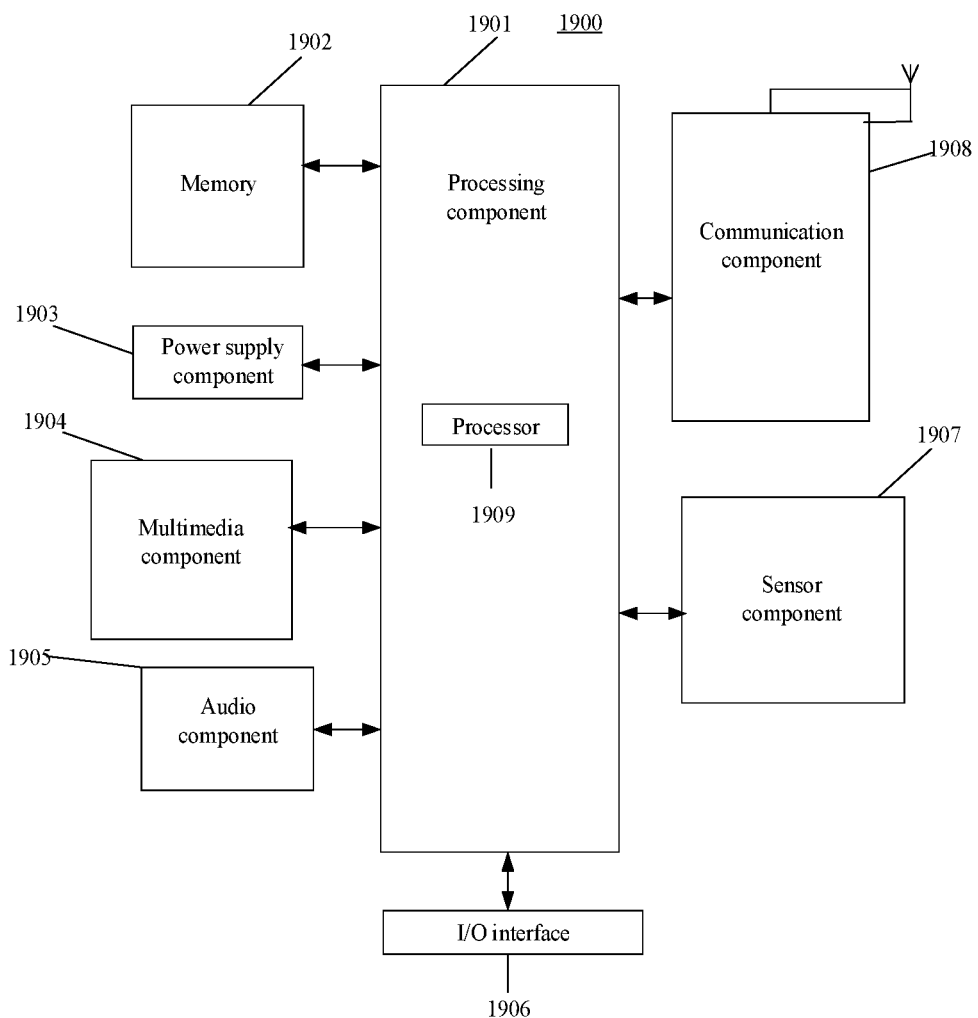
FIG. 19 is a structural diagram illustrating an apparatus for acquiring common downlink control information according to an example of the present disclosure.

FIG. 19 is a structural diagram illustrating an apparatus for acquiring common DCI according to an example. As shown in FIG. 19, an apparatus 1900 may be a computer, a mobile phone, a digital broadcast terminal, a messaging device, a game console, a tablet device, a medical equipment, a fitness equipment, a personal digital assistant and other terminals.

Referring to FIG. 19, the apparatus 1900 may include one or more of the following components: a processing component 1901, a memory 1902, a power component 1903, a multimedia component 1904, an audio component 1905, an input/output (I/O) interface 1906, a sensor component 1907, and a communication component 1908.

The processing component 1901 usually controls the overall operation of the apparatus 1900, such as operations associated with display, telephone calls, data communications, camera operations, and recording operations. The processing component 1901 may include one or more processors 1909 to execute instructions to perform all or part of the steps in the methods described above. Moreover, the processing component 1901 may include one or more modules to facilitate interaction between the processing component 1901 and other components. For example, the processing component 1901 may include a multimedia module to facilitate interaction between the multimedia component 1904 and the processing component 1901.

The memory 1902 is configured to store various types of data to support operation at the apparatus 1900. Examples of these data include instructions for any application or method operating at the apparatus 1900, contact data, phone book data, messages, pictures, videos, and the like. The memory 1902 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1903 provides power to various components of the apparatus 1900. The power component 1903 may include a power management system, one or more power sources, and other components associated with power generated, managed, and distributed for the apparatus 1900.

The multimedia component 1904 includes a screen that provides an output interface between the apparatus 1900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1904 includes a front camera and/or a rear camera. When the apparatus 1900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1905 is configured to output and/or input audio signals. For example, the audio component 1905 includes a microphone (MIC) configured to receive an external audio signal when the apparatus 1900 is in an operation mode, such as a call mode, a recording mode, and a voice recognition mode. The received audio signal may be further stored in the memory 1902 or transmitted via the communication component 1908. In some examples, the audio component 1905 also includes a loudspeaker for outputting an audio signal.

The I/O interface 1906 provides an interface between the processing component 1901 and a peripheral interface module which may be a keyboard, a click wheel, a button, or the like. These buttons may include, but are not limited to a home button, a volume button, a start button, and a lock button.

The sensor component 1907 includes one or more sensors for providing a status assessment in various aspects to the apparatus 1900. For example, the sensor component 1907 may detect an on/off state of the apparatus 1900, and the relative positioning of components, for example, the component is a display and a keypad of the apparatus 1900. The sensor component 1907 may also detect a change in position of the apparatus 1900 or a component of the apparatus 1900, the presence or absence of a user in contact with the apparatus 1900, the orientation or acceleration/deceleration of the apparatus 1900 and a change in temperature of the apparatus 1900. The sensor component 1907 may include a proximity sensor configured to detect the presence of nearby objects without any physical contact. The sensor component 1907 may also include a light sensor, such as a CMOS or CCD image sensor, for use in imaging applications. In some examples, the sensor component 1907 may also include an acceleration sensor, a gyro sensor, a magnetic sensor, a pressure sensor, or a temperature sensor.

The communication component 1908 is configured to facilitate wired or wireless communication between the apparatus 1900 and other devices. The apparatus 1900 may access a wireless network based on a communication standard, such as Wi-Fi, 2G or 3G, or a combination thereof. In an example, the communication component 1908 receives broadcast signals or broadcast associated information from an external broadcast management system via a broadcast channel. In an example, the communication component 1908 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1900 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as a memory 1902 including instructions, where the instructions are executable by the processor 1909 of the apparatus 1900 to perform the method as described above. For example, the non-transitory computer readable storage medium may be a ROM, a random-access memory (RAM), a CD-ROM, a magnetic tape, a floppy disk, and an optical data storage device.

When the instructions in the storage medium are executed by the processor, the apparatus 1900 is enabled to perform any of the methods of acquiring the common DCI as described above.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of transmitting common downlink control information, the method being applied to a base station and comprising:
    group-scrambling common downlink control information with pieces of preset group-scrambling information corresponding to terminal groups one by one to acquire grouped common downlink control information, wherein the pieces of the preset group-scrambling information comprise: a preset radio network temporary identifier (RNTI) and a plurality of preset scrambling sequences, wherein the plurality of preset scrambling sequences correspond to the terminal groups one by one; and
    transmitting a physical downlink control channel (PDCCH) carrying target common downlink control information to a terminal, so that the terminal demodulates the PDCCH according to the pieces of the preset group-scrambling information to acquire the target common downlink control information,
    wherein the target common downlink control information is common downlink control information of the grouped common downlink control information corresponding to a target terminal group to which the terminal belongs; and
    wherein group-scrambling the common downlink control information with the pieces of the preset group-scrambling information corresponding to the terminal groups one by one comprises: for each of the terminal groups, performing a first scrambling, by using the preset RNTI, on a cyclic redundancy check (CRC) code added to the common downlink control information, and performing a second scrambling, by using a preset scrambling sequence corresponding to the terminal group, on the scrambled CRC code.

2. The method according to claim 1, further comprising:
    transmitting the pieces of the preset group-scrambling information to the terminal via target signaling, wherein the target signaling comprises any of radio resource control signaling, system information, a medium access control (MAC) control element, and physical layer signaling.

3. The method according to claim 1, further comprising: grouping terminals based on a service types of each terminal or a transmission feature of each terminal.

4. The method according to claim 3, wherein in response to grouping terminals based on the transmission feature of each terminal, the grouping based on at least one of: a direction of a beam transmitted from the base station corresponding to the terminal when the base station performs beam sweeping in a current cell; a length of a cyclic prefix; or a time interval for the terminal to respond after receiving a request from a network side.

5. A method of acquiring common downlink control information, the method being applied to a terminal and comprising:
    receiving a PDCCH carrying target common downlink control information from a base station, wherein the target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one; and
    demodulating the PDCCH according to the pieces of the preset group-scrambling information to acquire the target common downlink control information;
    wherein the pieces of the preset group-scrambling information comprise: a preset RNTI and a plurality of preset scrambling sequences, wherein the plurality of preset scrambling sequences correspond to the terminal groups one by one; and
    wherein group-scrambling the common downlink control information with the pieces of the preset group-scrambling information corresponding to the terminal groups one by one comprises: for each of the terminal groups, performing a first scrambling, by using the preset RNTI, on a CRC code added to the common downlink control information, and performing a second scrambling, by using a preset scrambling sequence corresponding to the terminal group, on the scrambled CRC code.

6. The method according to claim 5, wherein demodulating the PDCCH according to the pieces of the preset group-scrambling information to acquire the target common downlink control information comprises:
    demodulating the PDCCH respectively with each piece of the preset group-scrambling information; and
    acquiring the target common downlink control information in a case where the PDCCH is successfully demodulated with target preset group-scrambling information of the preset group-scrambling information.

7. The method according to claim 5, wherein demodulating the PDCCH according to the pieces of the preset group-scrambling information to acquire the target common downlink control information comprises:
    determining, from among the plurality of the preset scrambling sequences, a target preset scrambling sequence corresponding to the target terminal group to which the terminal belongs; and
    demodulating the PDCCH according to the preset RNTI and the target preset scrambling sequence to acquire the target common downlink control information.

8. The method according to claim 5, wherein, prior to demodulating the PDCCH according to the pieces of the preset group-scrambling information to acquire the target common downlink control information, the method further comprises:

acquiring the pieces of the preset group-scrambling information based on a pre-defined protocol for communication between the terminal and the base station; or
receiving the pieces of the preset group-scrambling information transmitted by the base station via target signaling, wherein the target signaling comprises any of radio resource control signaling, system information, a MAC control element, and physical layer signaling.

9. The method according to claim 5 further comprising:
grouping the terminal based on a service types of the terminal or a transmission feature of the terminal.

10. The method according to claim 9, wherein in response to grouping the terminal based on the transmission feature of the terminal, the grouping based on at least one of:
a direction of a beam transmitted from the base station corresponding to the terminal when the base station performs beam sweeping in a current cell;
a length of a cyclic prefix; or
a time interval for the terminal to respond after receiving a request from a network side.

11. An apparatus for transmitting common downlink control information, the apparatus being applied to a base station and comprising:
a processor; and
a memory for storing instructions executable by the processor;
wherein the processor is configured to:
group-scramble common downlink control information with pieces of preset group-scrambling information corresponding to terminal groups one by one to acquire grouped common downlink control information, wherein the pieces of the preset group-scrambling information comprise: a preset RNTI and a plurality of reset scrambling sequences, wherein the plurality of preset scrambling sequences correspond to the terminal groups one by one; and
transmit a PDCCH carrying target common downlink control information to a terminal, so that the terminal demodulates the PDCCH according to the pieces of the preset group-scrambling information to acquire the target common downlink control information,
wherein the target common downlink control information is common downlink control information of the grouped common downlink control information corresponding to a target terminal group to which the terminal belongs; and
wherein group-scrambling the common downlink control information with the pieces of the preset group-scrambling information corresponding to the terminal groups one by one comprises: for each of the terminal groups, performing a first scrambling, by using the preset RNTI, on a CRC code added to the common downlink control information, and performing a second scrambling, by using a preset scrambling sequence corresponding to the terminal group, on the scrambled CRC code.

12. The apparatus according to claim 11, the processor is further configured to:
transmit the pieces of the preset group-scrambling information to the terminal via target signaling, wherein the target signaling comprises any of radio resource control signaling, system information, a medium access control (MAC) control element, and physical layer signaling.

13. An apparatus for acquiring common downlink control information, the apparatus being applied to a terminal and comprising:
a processor; and a memory for storing instructions executable by the processor;
wherein the processor is configured to:
receive a PDCCH carrying target common downlink control information from a base station, wherein the target common downlink control information is common downlink control information of grouped common downlink control information corresponding to a target terminal group to which the terminal belongs, and the grouped common downlink control information is groups of common downlink control information acquired by the base station group-scrambling common downlink control information with pieces of preset group-scrambling information corresponding to terminal groups one by one; and
demodulate the PDCCH according to the pieces of the preset group-scrambling information to acquire the target common downlink control information;
wherein the pieces of the preset group-scrambling information comprise: a preset RNTI and a plurality of preset scrambling sequences, wherein the plurality of preset scrambling sequences correspond to the terminal groups one by one; and
wherein group-scrambling the common downlink control information with the pieces of the preset group-scrambling information corresponding to the terminal groups one by one comprises: for each of the terminal groups, performing a first scrambling, by using the preset RNTI, on a CRC code added to the common downlink control information, and performing a second scrambling, by using a preset scrambling sequence corresponding to the terminal group, on the scrambled CRC code.

14. The apparatus according to claim 13, wherein demodulating the PDCCH according to the pieces of the preset group-scrambling information to acquire the target common downlink control information comprises:
demodulating the PDCCH respectively with each piece of the preset group-scrambling information; and
acquiring the target common downlink control information in a case where the PDCCH is successfully demodulated with target preset group-scrambling information of the preset group-scrambling information.

15. The apparatus according to claim 13, wherein demodulating the PDCCH according to the pieces of the preset group-scrambling information to acquire the target common downlink control information comprises:
determining, from among the plurality of the preset scrambling sequences, a target preset scrambling sequence corresponding to the target terminal group to which the terminal belongs; and
demodulating the PDCCH according to the preset RNTI and the target preset scrambling sequence to acquire the target common downlink control information.

16. The apparatus according to claim 13, wherein, prior to demodulating the PDCCH according to the pieces of the preset group-scrambling information to acquire the target common downlink control information, the processor is further configured to:
acquire the pieces of the preset group-scrambling information based on a pre-defined protocol for communication between the terminal and the base station; or
receive the pieces of the preset group-scrambling information transmitted by the base station via target signaling, wherein the target signaling comprises any of radio resource control signaling, system information, a MAC control element, and physical layer signaling.

17. A communication system implementing the method according to claim 1, comprising the base station and the terminal groups, wherein:
- a terminal among the terminal groups is configured to receive, from the base station, the PDCCH carrying the target common downlink control information;
- the target common downlink control information is common downlink control information of grouped common downlink control information corresponding to a target terminal group to which the terminal belongs;
- the grouped common downlink control information is groups of common downlink control information acquired by the base station group-scrambling common downlink control information with pieces of preset group-scrambling information corresponding to terminal groups one by one; and
- the terminal is further configured to demodulate the PDCCH according to the pieces of the preset group-scrambling information to acquire the target common downlink control information, thereby acquiring the target common downlink control information corresponding to the target terminal group to which the terminal belongs.

18. The system of claim 17, wherein:
- the terminal is further configured to demodulate the PDCCH respectively with each piece of the preset group-scrambling information;
- the target preset group-scrambling information in the preset group-scrambling information is configured to facilitate demodulating the PDCCH, so as to acquire the target common downlink control information after demodulation;
- the terminal is further configured to acquire the pieces of the preset group-scrambling information based on a pre-defined protocol for communication between the terminal and the base station, or receive the pieces of the preset group-scrambling information transmitted by the base station via target signaling.

* * * * *